(12) United States Patent
Klappert

(10) Patent No.: US 8,849,097 B2
(45) Date of Patent: Sep. 30, 2014

(54) ENERGY-EFFICIENT MEDIA EQUIPMENT DEVICE

(75) Inventor: Walter Richard Klappert, Los Angeles, CA (US)

(73) Assignee: United Video Properties, Inc., Santa Clara, CA (US)

( * ) Notice: Subject to any disclaimer, the term of this patent is extended or adjusted under 35 U.S.C. 154(b) by 1276 days.

(21) Appl. No.: 12/643,727

(22) Filed: Dec. 21, 2009

(65) Prior Publication Data

US 2011/0150431 A1 Jun. 23, 2011

(51) Int. Cl.
*H04N 5/76* (2006.01)
*H04N 21/436* (2011.01)
*H04N 21/443* (2011.01)
*H04N 21/84* (2011.01)
*H04N 21/433* (2011.01)
*H04N 21/472* (2011.01)
*H04N 7/16* (2011.01)

(52) U.S. Cl.
CPC ..... *H04N 21/4436* (2013.01); *H04N 21/43615* (2013.01); *H04N 21/4432* (2013.01); *H04N 21/84* (2013.01); *H04N 21/433* (2013.01); *H04N 21/47214* (2013.01); *H04N 7/163* (2013.01)
USPC .................................................. 386/291

(58) Field of Classification Search
USPC ......... 386/291, 292, 293, 294, 295, 296, 297, 386/298, 299, 239, 358
See application file for complete search history.

(56) References Cited

U.S. PATENT DOCUMENTS

| | | | |
|---|---|---|---|
| 6,292,943 | B1 | 9/2001 | Shin et al. |
| 7,411,631 | B1 * | 8/2008 | Joshi et al. ............. 348/734 |
| 7,506,349 | B2 | 3/2009 | Rodolico |
| 7,516,340 | B2 | 4/2009 | Landry et al. |
| 2002/0124266 | A1 | 9/2002 | Blanchard |
| 2003/0204857 | A1 | 10/2003 | Dinwiddie et al. |
| 2004/0051813 | A1 | 3/2004 | Marmaropoulos |
| 2004/0197082 | A1 * | 10/2004 | Yim ............................ 386/83 |
| 2005/0289624 | A1 | 12/2005 | Shin |
| 2007/0192822 | A1 | 8/2007 | White |
| 2007/0208890 | A1 * | 9/2007 | Ito et al. ................. 710/36 |
| 2008/0065234 | A1 | 3/2008 | Igoe |
| 2009/0001928 | A1 | 1/2009 | Fee et al. |
| 2009/0320055 | A1 * | 12/2009 | Langille et al. ........... 725/14 |

* cited by examiner

*Primary Examiner* — Tat Chio
(74) *Attorney, Agent, or Firm* — Ropes & Gray LLP

(57) ABSTRACT

Method and systems for operating a media equipment device having at least a full-power mode and an off-power mode are provided. A voltage supply to the media equipment device may be controlled by the media equipment device itself or by an external power management unit to automatically power-off the media equipment device, and power the device back on a future time. Prior to powering off the media equipment device, a portion of program schedule information stored in the volatile memory of the media equipment device may be mirrored to nonvolatile memory and may be restored on a priority basis after the media equipment device is powered back up. An external power management unit for controlling the media equipment device may also automatically detect and identify devices in the home based on a power signature of the device and manage the operation of the device based on the identification.

44 Claims, 9 Drawing Sheets

ENERGY-EFFICIENT MEDIA EQUIPMENT DEVICE

BACKGROUND

This invention relates generally to operating media equipment devices, and is particularly applicable, without limitation, to systems and methods for operating energy-efficient media equipment devices.

As media equipment devices, such as set-top boxes, have become ubiquitous fixtures in many homes, concerns have arisen over the amount of energy consumed by these devices. In 2006, set-top boxes alone consumed about 20 terawatt-hours of energy in the United States. One reason for this relatively high energy consumption by set-top boxes is that short of reaching behind an obstacle to physically unplug power to the device, users do not have an effective means to power down the device when not in use. Under current architecture, "turning off" a set-top box (e.g., by depressing the power button on the device or a remote control) does not result in a significant reduction in the energy consumed by the set-top box. This is because set-top boxes are configured to remain responsive to the service provider even when "turned off," in order to receive data and service updates from the service provider. With the advent of personal recorders, such as digital video recorders (DVRs), set-top boxes also stay powered up in order to perform program recordings. In addition, current set-top boxes store program schedule information received from the service provider in volatile memory, leading to loss of all program schedule information if the set-top box is left without power. Loss of locally-stored program schedule data is a significant impediment to securing user cooperation in reducing the energy consumption of set-top boxes. For example, a set-top box that loses power can take fifteen minutes or more to restore short-term program guide data for programs that are currently being broadcast, and about a day to restore longer-term program guide data needed to access programs being broadcast in a week. With increasing reliance on digital video recorders (DVRs), even long-term data have become important to users and the inability to access such data can significantly impact the user's enjoyment of their entertainment experience.

SUMMARY

The present invention provides systems and methods for operating an energy-efficient media equipment device. Using principles consistent with the present invention, a media equipment device may be automatically disconnected from a power supply if one or more threshold conditions are met. To minimize the impact of energy efficiency on the user's entertainment experience, the device may be automatically turned back on at a time that coincides with a user- or provider-scheduled action for the media equipment. Provision may also be made to mirror at least a portion of program schedule information obtained by the media equipment device to a non-volatile storage unit before disconnecting power from the media equipment device, and for restoring the same when the media equipment device is powered back on.

The media equipment device may be configured with at least a full-power mode and an off-power mode. The media equipment device may optionally include a standby mode of operation. The device may include a power supply interface that receives a voltage supply via a computer-controlled power source. When the device is in full-power mode, the power supply interface receives voltage from the computer-controlled power source and in turn provides voltage to the functional units of the media equipment device. A user may interact with a media equipment device in full-power mode to view a program, schedule a task (e.g., a recording), or select various system settings. A media equipment device in full power mode may also receive and process externally-generated messages from a service provider. In contrast, a media equipment device in off-power mode does not receive a voltage supply from the computer-controlled power source or from any other external voltage supply. Other than possibly small amounts of leakage current that may continue to flow through the power supply interface of the media equipment device, the media equipment device in off-power mode may be functionally equivalent to one that is physically unplugged from its power outlet. When in off-power mode, the media equipment device is incapable of receiving, decoding, or processing messages from a service provider. For example, the media equipment device cannot be turned on directly by a signal from the service provider. Rather, the device may be powered on only by a user input to turn on the device or by a command to the computer-controlled power source to reconnect voltage to the device. A media equipment device in the optional standby mode may receive a full voltage supply or a reduced voltage supply Importantly, when in standby mode, the media equipment device may receive, decode, and process messages from a service provider even if other functional units in the device are rendered inoperative. In the description that follows, the full-power mode and the standby mode may be collectively referred to as a "powered-up" state and off-power mode may be referred to as a "powered-down" state.

In an embodiment, a media equipment device in powered-up state receives a voltage supply from a computer-controlled power source. The computer-controlled power source may be included in the media equipment device (e.g., as part of the power supply interface of the media equipment device), or may be external to the media equipment device (e.g., as part of a power strip coupled to the media equipment device and possibly shared with other devices). In a first embodiment, the computer-controlled power source is controlled by the media equipment device. In this embodiment, the media equipment device includes one or more timers having a separate timer processing circuitry that is powered by a separate battery supply when the media equipment device is placed in the off-power mode. The one or more timers monitor a scheduled power-up time for the media equipment device and restore an electrical connection between the computer-controlled power source and the power supply interface of the media equipment device at the appropriate time. In a second embodiment, the computer-controlled power source is controlled by an external power management unit (PMU). In this embodiment, the PMU may transmit power-on or power-off messages to the computer-controlled power source at appropriate times. The computer-controlled power source may automatically connect voltage to or disconnect voltage from the power supply interface of the media equipment device in accordance with the messages received from the PMU.

In both the first and the second embodiments described above, a determination may be made whether a threshold condition for automatically disconnecting voltage from the media equipment device is met prior to placing the media equipment device in the off-power mode. The determination may be made by the media equipment device itself or by the external PMU. In an embodiment, the PMU or the media equipment device polls the media equipment device at appropriate intervals to determine if the user equipment can be automatically placed in the off-power mode. In an embodiment, the polling occurs only when the user equipment is in a standby mode, indicating that the device is not currently being used. Typically, the media equipment device would make the determination if the media equipment device controls the computer-controlled power source, and the PMU would make the determination if the PMU controls the power source. However, this may not necessarily be the case. The threshold condition may be determined based on criteria that includes a user-specified operating schedule for the device, a usage pattern derived from user profiles associated with the media equipment device, the performance of a scheduled action (e.g., a recording), a duration for which the device has been in the standby mode, or other suitable criteria. In an embodiment, the threshold condition is met when a user transitions the device from the full-power mode to the standby mode after a certain time of the day (e.g., after 10:00 PM at night), or when no user- or provider-scheduled action for the media equipment device occurs for at least a predetermined duration. In an embodiment, the determination is based on receiving an indication from a presence-detecting circuitry that the media equipment device has been unused for at least a predetermined duration. In response to determining that the threshold condition is met, the media equipment device or the external PMU may send a power-off notification to the computer-controlled power source to disconnect voltage from the power supply interface of the media equipment device, thereby placing the device in the off-power mode. In an embodiment, the media equipment device may provide a warning to a user if the media equipment device is in active use, and may provide the user with an option to postpone placing the media equipment device in off-power mode.

In an embodiment, a scheduled power-up time may be determined for the media equipment device prior to disconnecting the voltage supply from the power supply interface of the media equipment device. The scheduled power-up time represents a future time at which the media equipment device may be automatically powered up by the media equipment itself or by an external PMU. The scheduled power-up time may be determined based on any suitable criteria, such as the start time of a scheduled recording, a scheduled reminder for a program, a user-programmed operating schedule for the media equipment device, or may be deduced from one or more user profiles associated with the media equipment device. The scheduled power-up time may be determined by the media equipment device itself, or by the external PMU. For example, even when the computer-controlled power source is controlled by the external PMU, the media equipment device may trigger a power-down sequence by sending a message to the PMU indicating that the media equipment device may be placed in the off-power mode. The message from the media equipment to the PMU may include a scheduled power-up time as determined by the media equipment device itself. Alternatively, the PMU may determine a scheduled power-up time for the media equipment device based on power profile information maintained by the PMU. In an embodiment, the timer circuitry in the media equipment device monitors the time and triggers an internal alarm at the scheduled power-up time. At the scheduled power-up time, the PMU or the internal timer of the media equipment device may send a power-up notification message to the computer-controlled power source, instructing the power source to reconnect voltage to the device. In an embodiment, a user may power-up the media equipment device prior to the scheduled wake-up time by activating a user input (e.g., a switch) on the media equipment device. In an embodiment, the user input may be coupled to the internal timer of the media equipment device, such that activating the user input triggers the monitoring alarm which sends a power-up notification message to the computer-controlled power source, causing the computer-controlled power source to reconnect a voltage supply to the power supply interface of the media equipment device.

In some embodiments, program schedule information obtained by the media equipment device from a service provider may be stored solely in volatile memory of the media equipment device. This is typically because the media equipment devices, e.g., set-top boxes, may not be equipped with hard drives or sufficient nonvolatile memory to store the entire set of available program schedule information. Storing program schedule information in volatile memory may also be desirable because the information may be retrieved faster than data stored to a nonvolatile memory. In such embodiments, disconnecting voltage from the media equipment device will result in loss of all program schedule information obtained by the media equipment device, and may not be restored for a significant period of time after the media equipment device is powered back on. Therefore, where program schedule information is stored in volatile memory of the media equipment device, some or all of the program schedule information may be mirrored to a nonvolatile storage mirror prior to placing the device in an off-power mode. In an embodiment where available nonvolatile memory is limited or where no hard disks are available to the media equipment device, only portions of the program schedule information that are most relevant or are most needed (e.g., program schedule information corresponding to user favorites, programs with scheduled reminders or recordings, and currently broadcast programs) may be mirrored to nonvolatile storage. The nonvolatile storage unit for mirroring the program schedule information may be an internal storage unit of the media equipment, or an external storage unit, or a remote server on the home network. Although restoring program schedule information from the mirror is not instantaneous, it will be understood that restoring program schedule information from a local storage device or a remote storage device on a home network may take significantly less time than relying on the remote carousel of the service provider.

In order to reduce user frustrations due to temporary unavailability of program schedule information when the media equipment device is first powered on from off-power mode, the scheduled power-up time may be set sometime before the next scheduled action for the media equipment device. This may allow the device to restore program schedule information from mirrored copy and/or to obtain updates from the service provider before the scheduled action occurs. For example, if the media equipment device is scheduled to record a program at 8:30 PM, the device may transition from off-power mode at 8:15 PM so that the device may restore at least program schedule data for currently broadcast programs before the recording takes place. In an embodiment, program schedule information mirrored to nonvolatile storage may be retrieved in an order based on a priority level assigned to each subset or portion of the program schedule information. For example, program schedule information for programs designated as user favorites may be retrieved before retrieving other program schedule information. In an embodiment, program schedule information for programs having scheduled reminders, recordings, or currently being broadcast may be retrieved from the mirror before program schedule information for other programs.

The external PMU described above may be manage the operation of other devices in the home, in addition to managing the operation media equipment devices. These additional devices may include any device or appliance that may be used in the home, ranging from fridges and telephones to power toothbrushes. In effect, any device that may be plugged into a power outlet (e.g., even to charge the device battery) may be controlled by the PMU. In an embodiment, the PMU is configured to automatically detect and identify the particular device coupled to an outlet of the computer-controlled power source before applying a voltage to the device. To identify the device, the PMU causes the computer-controlled power source to provide a classification voltage to the power supply interface of the device coupled to one of the outlets of the computer-controlled power source. The classification voltage may be a DC voltage signal having a magnitude within a specified range. In response to providing the classification voltage, the computer-controlled power source may receive a voltage or a current signature from the device. Information regarding the voltage or current signature (e.g., the magnitude) may be provided to the PMU. The PMU may compare the received voltage or current signature to a plurality of device identification codes that may be stored locally or remotely. The classification codes may be provided by device manufacturers, and each code may correspond to a unique current or voltage signature for a particular device. In an embodiment, the PMU may determine an appropriate power management schedule for the device based, for example, on third party (e.g., EPA) recommended power management schemes, manufacturer recommendations, usage patterns, or other suitable criteria. While the discussion below focuses on media equipment devices, the PMU and the related power management methods and systems may be applied to any suitable device or appliance in the home.

BRIEF DESCRIPTION OF THE DRAWINGS

The above and other objects and advantages of the invention will be apparent upon consideration of the following detailed description of illustrative embodiments, taken in conjunction with the accompanying drawings, in which like reference characters refer to like parts throughout, and in which.

DETAILED DESCRIPTION OF ILLUSTRATIVE EMBODIMENTS

Figure 1:
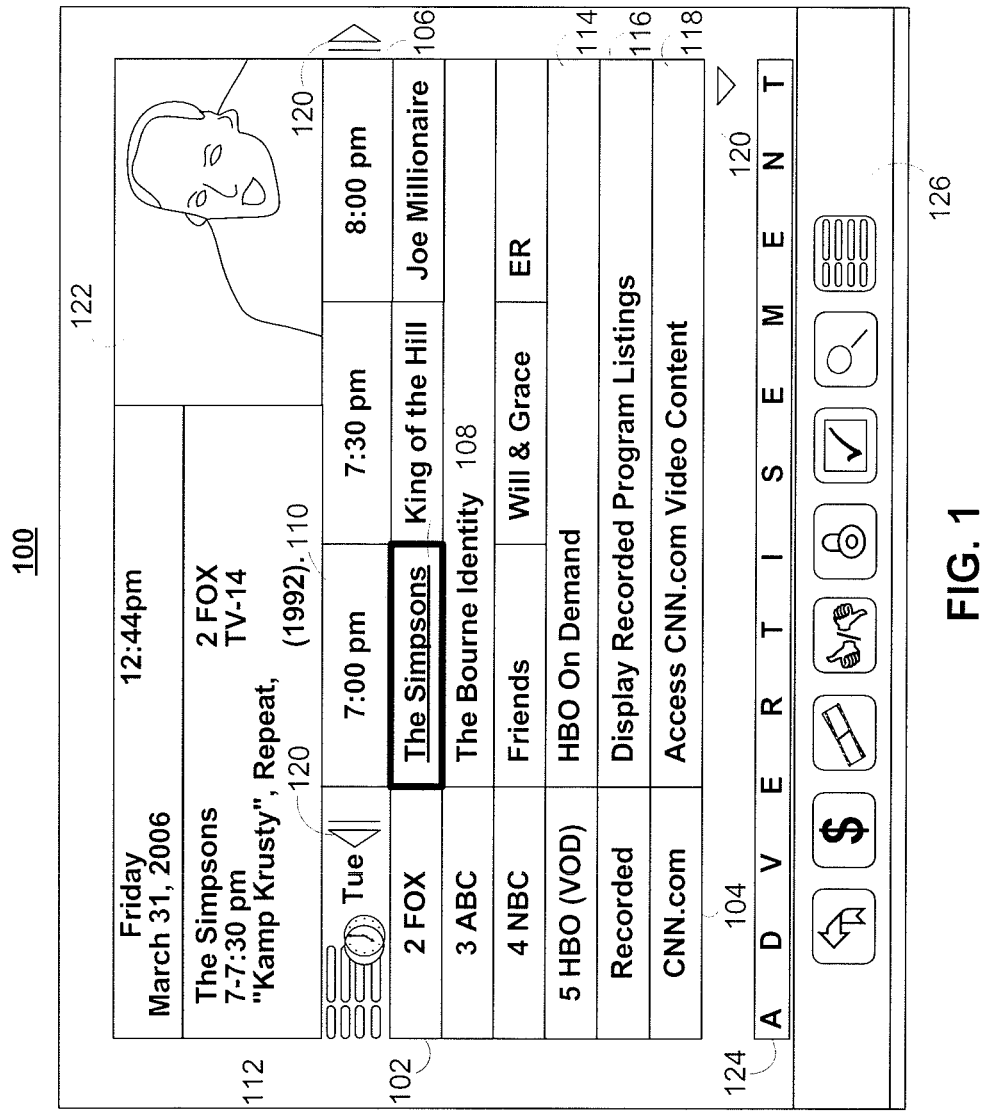
FIGS. 1 and 2 show illustrative display screens that may be used to provide media guidance application listings in accordance with some embodiments of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 2:
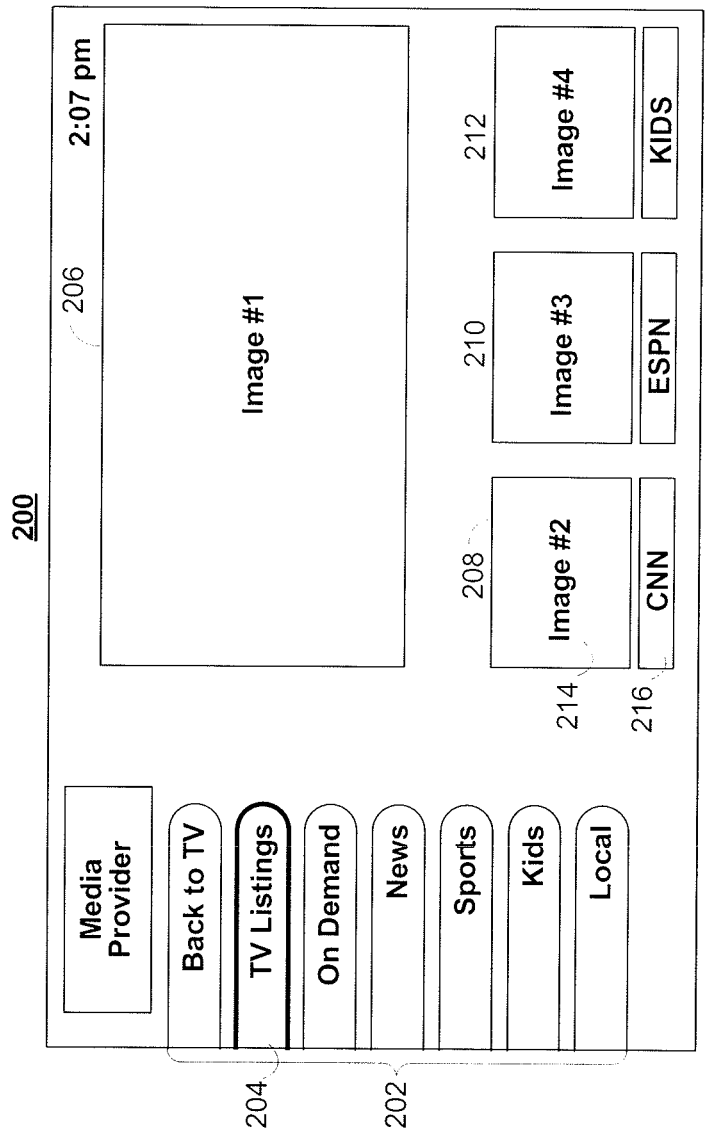

One of the functions of the media guidance application is to provide media listings and media information to users. FIGS. 1-2 show illustrative display screens that may be used to provide media guidance, and in particular media listings. The display screens shown in FIGS. 1-2 may be implemented on any suitable device or platform. While the displays of FIGS. 1-2 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
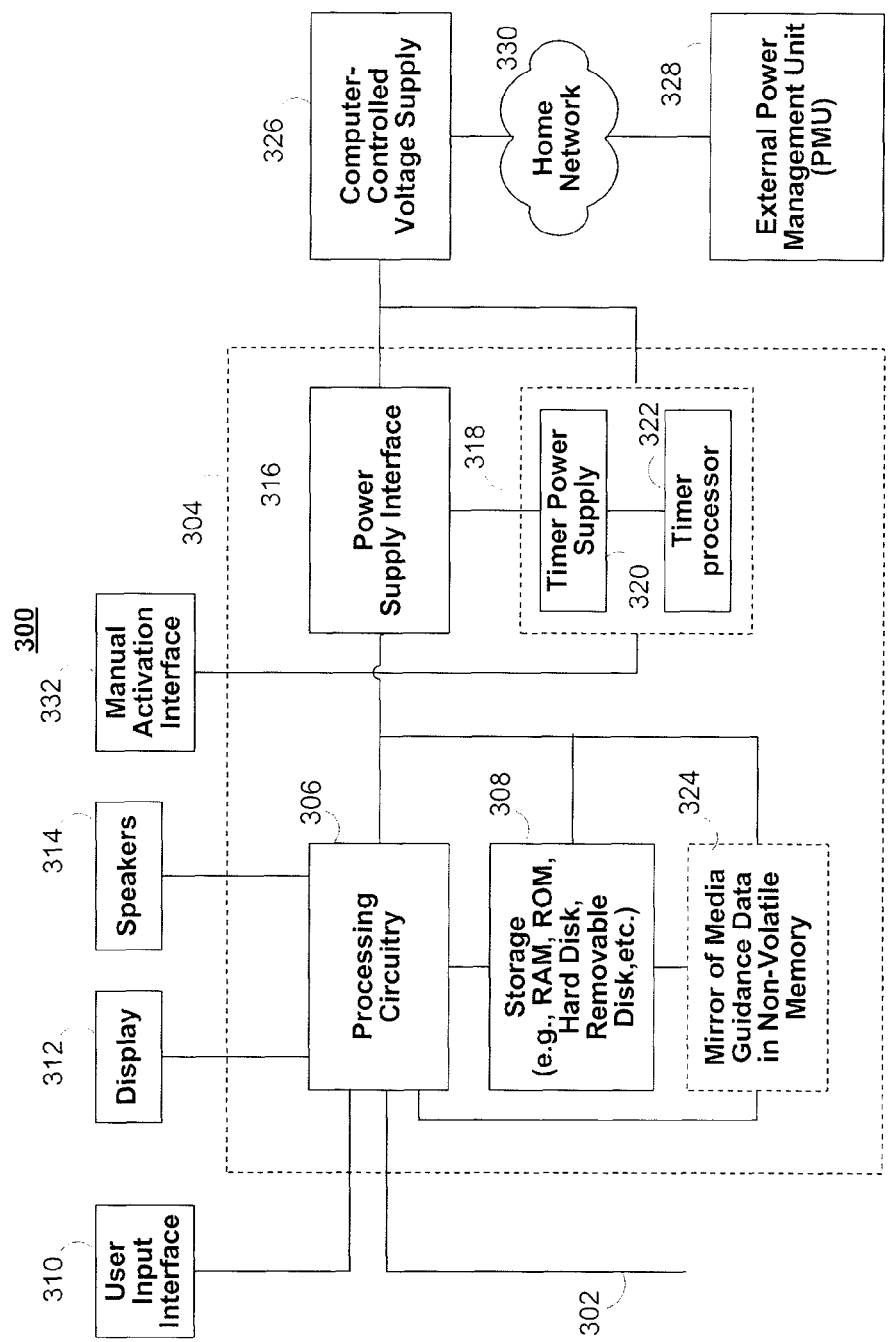
FIG. 3 shows an illustrative user equipment device in accordance with some embodiments of the invention.

Users may access media content and the media guidance application (and its display screens described above) from one or more of their user equipment devices. FIG. 3 shows a generalized embodiment of illustrative user equipment device 300. More specific implementations of user equipment devices are discussed below in connection with FIG. 4. User equipment device 300 is configured to operate in a full-power mode and an off-power mode, and may optionally also include a standby mode. When in off-power mode, user equipment device 300 is only responsive to a power-up signal generated by user interaction with user equipment 300, or by external power management unit 328 as described in more detail below. When in full-power or standby-mode (collectively referred to as the powered-up state), user equipment device 300 may receive media content and data via input/output (hereinafter "I/O") path 302. I/O path 302 may provide media content (e.g., broadcast programming, on-demand programming, Internet content, and other video or audio) and data to control circuitry 304, which may include processing circuitry 306, storage 308, power supply interface 316, timer circuitry 318, and nonvolatile memory 324 for storing a mirror copy of some or all of the media guidance application data obtained by user equipment 300. When in a powered-up state, control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308 or nonvolatile storage 324). In client-server based embodiments, control circuitry 304 may include communications circuitry suitable for communicating with a guidance application server or other networks or servers when user equipment 300 is in a powered-up state. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. In an embodiment, user equipment 300 may store program guidance information (e.g., program schedules) in volatile memory in storage 308 when in the full-power or standby mode.

Figure 4:
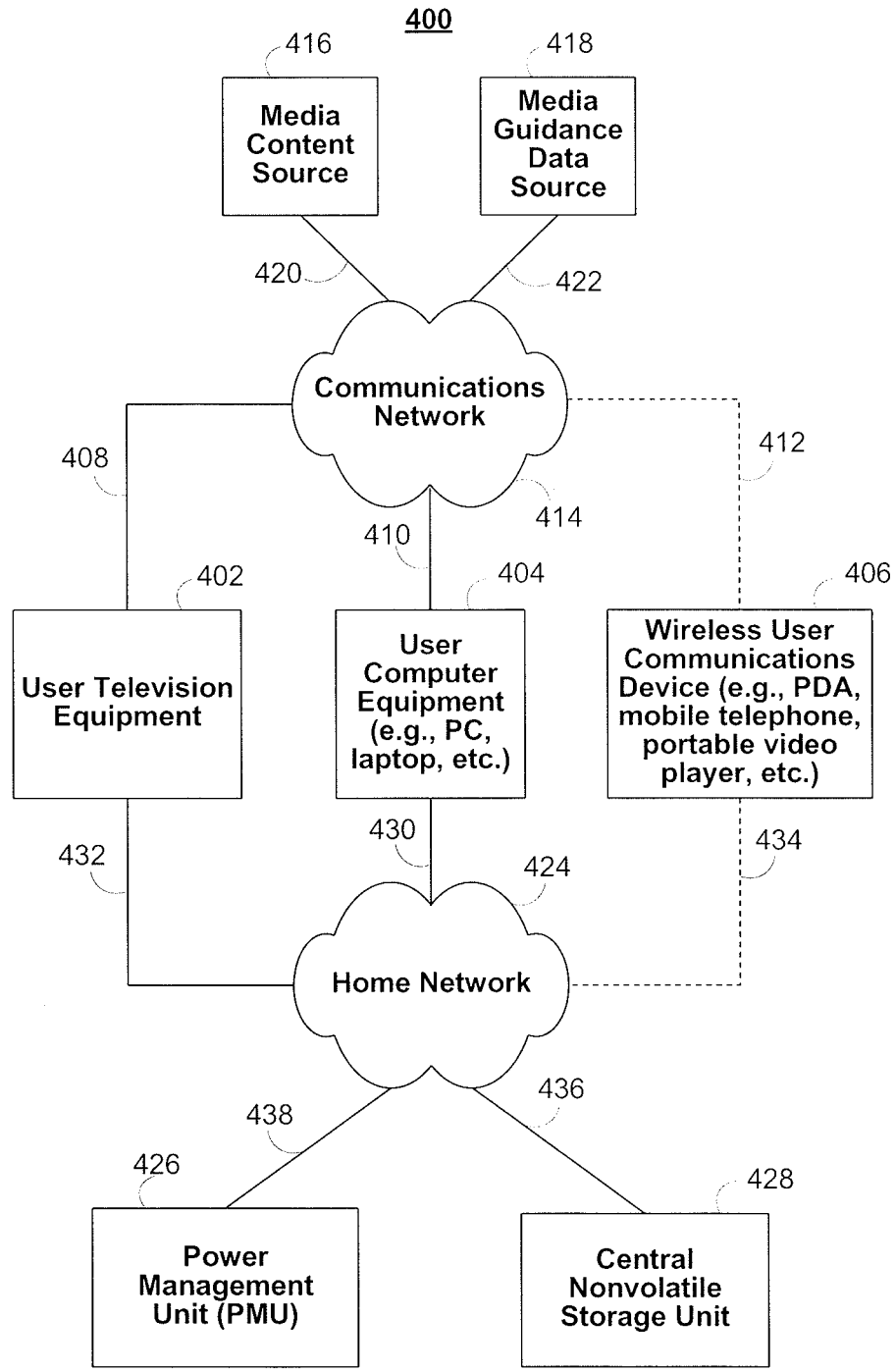
FIG. 4 is a simplified diagram of an illustrative interactive media system in accordance with some embodiments of the invention.

In some embodiments, program schedule information obtained by the media equipment device from a service provider may be stored solely in the volatile memory portion of storage 308. This is typically because storage 308 may not include a hard disk or sufficient nonvolatile memory to store the entire set of program schedule information obtained by user equipment device 300. Even when storage 308 includes non-volatile memory, storing program schedule information in volatile memory may be desirable because the information may be retrieved faster than data stored to a nonvolatile memory. In such embodiments, disconnecting voltage from the media equipment device will result in loss of all program schedule information obtained by user equipment device 300. Therefore, where program schedule information is stored in volatile memory portion of storage 308, some or all of the program schedule information may be mirrored to nonvolatile storage mirror 324 prior to placing user equipment device 300 in an off-power mode. In an embodiment where available nonvolatile memory 324 is limited, only portions of the program schedule information that are most relevant or are most needed (e.g., program schedule information corresponding to user favorites, programs with scheduled reminders or recordings, and currently broadcast programs) may be mirrored to nonvolatile memory 324. Furthermore, in some embodiments, program schedule information for user equipment device 300 may be stored directly in nonvolatile memory 324, bypassing the volatile memory portion of storage 308 and obviating the need to mirror the program schedule information. It is understood that in these embodiments, small portions of the program schedule information may be cached in volatile memory for quick access. Nonvolatile memory 324 may be an internal storage unit (as shown in FIG. 3), an external storage unit, or a remote server on the home network (as shown in FIG. 4). Although nonvolatile memory 324 is shown as being separate from storage 308, nonvolatile memory 324 may correspond to a portion of the nonvolatile memory included in storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300 when user equipment 300 is in a powered-up state. Circuitry 304 may also include digital-to-analog converter circuitry and analog-to-digital converter circuitry for converting between digital and analog signals. The tuning and encoding circuitry may be used by the user equipment to receive and to display, to play, and/or to record media content when user equipment 300 is in a powered-up state. The tuning and encoding circuitry may also be used to receive guidance data when user equipment 300 is in a powered-up state. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

When user equipment 300 is in an off-power mode, manual activation interface 332 may be activated by a user to power-up user equipment 300 from the off-power mode to a full-power mode before the scheduled power-up time of user equipment device 300. In this illustrative embodiment, manual activation interface 332 is coupled to timer circuitry 318 such that activating manual interface 332 causes the timer 318 to send a power-up message to computer-controlled power source 326, causing computer-controlled power source 326 to reconnect voltage supply to power supply interface 316. Along these lines, activating manual activation interface 332 may trigger a similar sequence of events as those described below in connection with determining that the scheduled power-up time for user equipment device 300 has been reached. Manual activation interface may also allow the user to manually cause user equipment 300 to enter the off-power mode. When user equipment 300 is placed in off-power mode manually, a scheduled power-up time may, but need not, be set. Manual activation interface 332 may be part of user input interface 310 and may also be coupled to processing circuitry 306, but is shown separately for illustrative purposes.

Control circuitry 304 also includes power supply interface 316 which provides voltage to control circuitry 304. Power supply interface 316 is electrically coupled to computer-controlled power source 326 using any suitable electrical path (e.g., a power line or an Ethernet cable). Although computer-controlled power source 326 is shown as being external to user equipment device 300, in some embodiments, computer-controlled power source 326 may be internal to the user equipment device, e.g., as part of control circuitry 304. Computer-controlled power source 326 may be communicatively coupled to external power management unit (PMU) 328 and may connect voltage to or disconnect voltage from power supply interface 316 in response to messages from external PMU 328 via home network 330. In an embodiment, computer controlled power source 326 may be controlled by the user equipment 300, rather than by external PMU 328. PMU 328 includes control circuitry (not shown) that controls the power functions of the user equipment device 300. As described more specifically below in connection with FIG. 5, the control circuitry of PMU 328 may have many similar components to a computer, including firmware and software, memory, a CPU, input/output functions, timers to measure intervals of time, as well as analog to digital converters to measure the voltages of batteries or power sources of user equipment device 300. Computer-controlled power source 326 may be configured to receive messages from external PMU 328 over an Ethernet cable, a power line, an infrared link, a WIFI link, or other suitable communication link In an embodiment, computer-controlled power source 326 may receive the power supply for distribution from external PMU 328, in which case power source 326 may also be electrically coupled to the PMU. Computer-controlled power source 326 may be the central power source for the home or other localized geographic unit where user equipment 300 is located, or may be a distributor of power from another source (not shown).

Control circuitry 304 may include timer circuitry 318 which includes a timer power supply 320 and a timer processor 322 for monitoring a scheduled power-up time for user equipment 300. Timer processor 322 is communicatively (but not necessarily electrically) coupled to computer-controlled power source 326. Timer power supply 320 may be an internal battery electrically coupled to power supply interface 316. When user equipment 300 is in a full power or standby mode, timer circuitry 318 receives voltage from power supply interface 316. Conversely, when user equipment 300 is in an off-power mode, timer circuitry 318 may be powered by electrical charge stored by timer power supply 320. Thus, even when control circuitry 304 receives no external voltage in off-power mode, timer circuitry 318 may remain active and may instruct computer-controlled power source 326 to connect voltage to or disconnect voltage from control circuitry 304 much like the external PMU 328.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach) when user equipment 300 is in a powered-up state. In another embodiment, the media guidance application is a client-server based application. Data for use by a client implemented on user equipment device 300 is retrieved on-demand by issuing requests to a remote server remote while the user equipment device 300 is in a powered-up state. In some embodiments, the client caches copies of the data received from the remote server. In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be implemented with EBIF widgets or as a TV widget. In other embodiments, the guidance application may be defined by a series of JAVA-based files that are received and run by a local virtual machine or other suitable middleware executed by control circuitry 304.

Downloaded data for the guidance application may be stored in volatile memory on user equipment device 300, or directly in nonvolatile memory, bypassing the volatile memory. Where the guidance application data is stored directly to nonvolatile memory, no mirroring is performed prior to powering off the user equipment 300. However, if the guidance application is stored in volatile memory, the most relevant or most used portions of the guidance application data may be mirrored to nonvolatile memory prior to powering down the device. In an embodiment, the portion of guidance application data that is mirrored may exclude guidance application data for programs that are being presented between the time the user equipment 300 is powered down and the scheduled power-up time. Alternatively, guidance application data for programs that are being presented before the scheduled power-up time may be included in the mirror but may not be retrieved if user equipment 300 is powered up after the corresponding programs have been presented. In either case, guidance application data in the mirror may be retrieved on a priority bases so that data that is most likely to be needed shortly after user equipment 300 is powered back on are retrieved before other guidance application data.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices or media equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application. In an embodiment, the settings include a power management schedule for user equipment devices 402, 404, and 406. For example, the user may specify times at which one or more of user equipment devices 402, 404, and 406 are to be automatically transitioned into or out the off-power mode. In an embodiment, the power management settings may be set or changed based on activity monitored by the guidance application. A user may also remotely power-off user equipment devices 402, 404, or 406 by transmitting messages from a remote user equipment device to the in-home device or to the external PMU 426. Since media equipment device cannot receive messages from remote sources while in the off-power mode, a user may remotely power-on a media equipment device only by transmitting a power-on message from a remote user equipment to the external PMU 426.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other within home network 424 using communication paths 430, 432, and 434, which are similar to those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. Home entertainment network 424 may be a hub or other similar device provided on a home network. Each of the multiple individuals in a single home may operate different user equipment devices on the home network 424. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

System 400 also includes power management unit (PMU) 426 and central nonvolatile storage unit 428 in communication with the user equipment devices. PMU 426 is similar to PMU 328 (FIG. 3) described above. PMU 426 and central nonvolatile storage unit 428 are coupled to home network 424 via communication paths 438 and 436 respectively, and communicate with the user equipment devices via home entertainment network 424. Communication paths 436 and 438 are similar to those described in connection with communication paths 408, 410, and 412. System 400 can include multiple power management units 426 (e.g., one for each one of user equipment devices 402, 404, and 406), but only one is shown to avoid overcomplicating the diagram. In an embodiment, PMU 426 monitors the power usage of the individual user equipment devices and runs diagnostics to determine an optimum power management schedule for each of the user equipment devices. PMU 426 may also receive power-up and power-down notifications from the user equipment devices 402, 404, or 406 based on power management schemes maintained by the individual devices. Using the power management schedule, PMU can send notifications to computer-controlled power source 326 (FIG. 3) to couple or decouple voltage from specific devices at appropriate times. In an embodiment, power supply to wireless communications device 406 may be controlled by PMU 426 when the device is plugged into a power outlet controlled by external PMU 426 (e.g., to optimize the charging of the battery of the device).

Central nonvolatile storage unit 428 may be any nonvolatile memory unit associated with the user equipment devices, and may be part of the internal storage unit of one of user equipment devices 402, 404, or 406,or a stand-alone storage device (e.g., an external hard-drive). Central nonvolatile storage unit 428 may store a copy of the guidance application data that user equipment devices 402, 404, and 406 obtain from media guidance data source 418 prior to powering down the user equipment devices. In an embodiment, guidance data from guidance data source 418 may be stored directly to central nonvolatile storage unit 428, bypassing the individual memory units in the user equipment devices. In other embodiments, central nonvolatile storage unit 428 stores a duplicate copy of the guidance data obtained by user equipment devices 402, 404, and 406. In yet other embodiments where available nonvolatile memory in central storage 428 is limited, central storage 428 may store only the most relevant or most needed portions of the guidance application data. The most needed or the most relevant portions of the guidance application data may include, without limitation, guidance application information for programs designated as user favorites, programs scheduled for recording or reminders, programs on the user's favorite channels, or programs scheduled to be presented within a certain period of time (e.g., 2 hours) after the user equipment device is scheduled to be powered back on.

In an embodiment, guidance application data stored by central nonvolatile storage unit 428 is created or updated only upon receiving a notification that one the user equipment device coupled to central nonvolatile storage unit 428 is about to transition into off-power mode. In another embodiment, central nonvolatile storage unit 428 is updated continuously or periodically while the user equipment devices are each in a powered-up state. In an embodiment, blocks of data provided to central nonvolatile storage unit 428 are assigned priorities and central nonvolatile storage unit 428 may store the data in a manner that permits retrieval based on the assigned priorities. The priorities may be assigned based on the likelihood that a particular block of guidance data would be needed shortly after the user equipment device transitions from the off-power mode. Priority calculations can be based on the scheduled power-up time for the device and factors such as the broadcast time of the programs associated with the data block, whether the block is associated with a favorite program, and whether the block is associated with a program for which a reminder is scheduled.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel) when the user equipment devices are active. Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application. In each of the above-described approaches, the program schedule data can be provided to media central nonvolatile storage unit 428 simultaneously, or at a later time (e.g., as part of preparations to place the user equipment device in an off-power mode). The user equipment devices cannot directly receive data or any other updates from the service provider or from media guidance data source 418 while in off-power mode.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). In some embodiments, the guidance application displays may be generated by the media guidance data source 418 and transmitted to the user equipment devices for display. In these embodiment, there may be no need for central nonvolatile storage unit 428 to mirror data prior to placing the user equipment device in an off-power mode. Alternatively, the media guidance data source 418 may transmit data for storage on the user equipment devices, which then generates the guidance application displays based on instructions processed by control circuitry. In the latter embodiments, central nonvolatile storage unit 428 can mitigate user frustrations resulting from loss of guidance application data by mirroring the guidance data prior to placing the user equipment device in an off-power mode. For example, downloaded data for the guidance application may be stored in volatile memory on user equipment devices 402, 404, and 406, or directly in nonvolatile memory, bypassing the volatile memory. Where the guidance application data is stored directly to nonvolatile memory, no mirroring is performed prior to powering off the user equipment device 402, 404, or 406. However, if the guidance application is stored in volatile memory, the most relevant or most used portions of the guidance application data may be mirrored to nonvolatile memory prior to powering down the device. In an embodiment, the portion of guidance application data that is mirrored may exclude guidance application data for programs that are being presented between the time the user equipment device 402, 404, or 406 is powered down and the scheduled power-up time. Alternatively, guidance application data for programs that are being presented before the scheduled power-up time may be included in the mirror but may not be retrieved if user equipment device 402, 404, or 406 is powered up after the corresponding programs have been presented. In either case, guidance application data in the mirror may be retrieved on a priority bases so that data that is most likely to be needed shortly after user equipment device 402, 404, or 406 is powered back on are retrieved before other guidance application data.

Media guidance system 400 is intended to illustrate a number of approaches, or network configurations, by which user equipment devices and sources of media content and guidance data may communicate with each other for the purpose of accessing media and providing media guidance in an energy-efficient manner. The present invention may be applied in any one or a subset of these approaches, or in a system employing other approaches for delivering media and providing media guidance. For example, in one approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may also power on or power off in-home devices using a remote device. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

Figure 5:
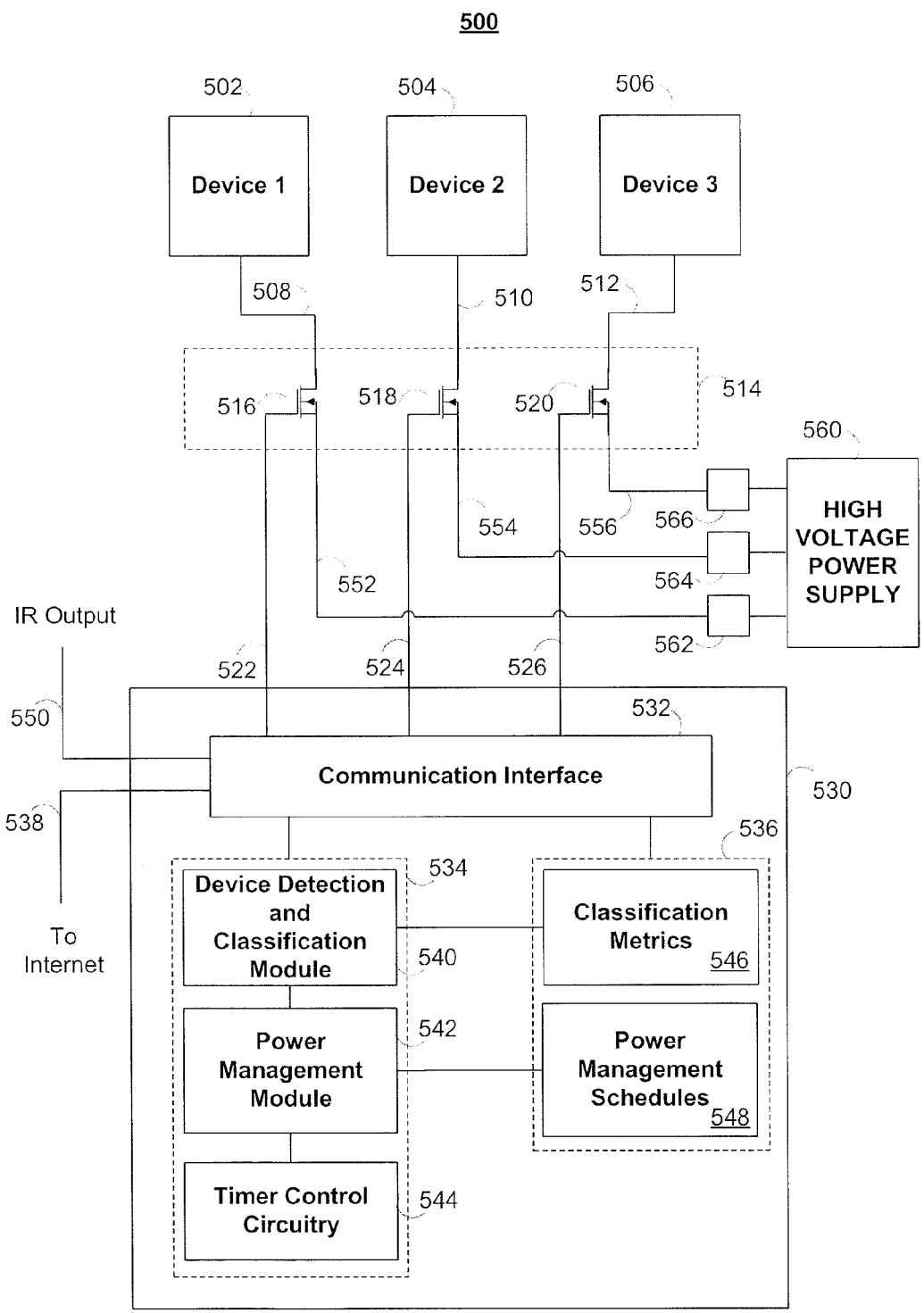
FIG. 5 is a block diagram of an illustrative external power management unit (PMU) for consumer electronic devices.

FIG. 5 is a block diagram of illustrative embodiment system 500 for managing the operation of multiple user equipment devices using an external power management unit (PMU). System 500 includes user equipment devices 502, 504, and 506 electrically coupled to computer-controlled power source 514 via power paths 508, 510, and 512 respectively. Devices 502, 504, and 506 may be similar to those described above in connection with user equipment devices 402, 404, and 406 (FIG. 4) and may each include control circuitry similar to those described in connection with control circuitry 304 (FIG. 3). Computer-controlled power source 514 may be similar to computer-controlled power source 326 (FIG. 3). System 500 may include any number of user equipment devices, but only three devices are shown to avoid overcomplicating the drawing. Similarly, system 500 may include any number of computer-controlled power sources 514, each having any number of outlets, but only one source having three outlets is shown for ease of illustration. Power paths 508, 510, and 512 may be any suitable paths for providing voltage from computer-controlled power source 514 to the user equipment devices, such as a wire, a firewire, a power line, an Ethernet cable, a USB cable, or a wireless power link Although no direct communication is shown between the user equipment devices and PMU 530, the user equipment devices may be communicatively coupled to PMU 530. Computer-controlled power source 514 is communicatively (and or electrically) coupled to PMU 530 via communication paths 522, 524, and 526. Paths 522, 524, and 526 may be any suitable communication paths, such as Ethernet cables that are capable of also carrying power signals using, for example, the Power over Ethernet (PoE) protocol of the IEEE 802.3 standard, or power lines capable of also transmitting data using power line communications. Where PMU 530 does not also provide power to power source 514, paths 522, 524, and 526 may be wireless communication links, or any suitable communication paths, such as those described in connection with paths 408, 410, and 412 (FIG. 4).

User equipment devices 502, 504, and 506 are electrically coupled to outlets (also referred to herein as switches) 516, 518, and 520, respectively, of computer-controlled power source 514. Switches 516, 518, and 520 may be individually controlled by PMU 530 to enable computer-controlled power source 514 to disconnect voltage from one coupled device while providing voltage to another coupled device. In this simplified embodiment, switches 516, 518, and 520 are single transistor switches having gate terminals coupled to communication paths 522, 524, and 526, respectively. However, any suitable switching configuration may be used. Specifically, each of switches 516, 518, and 520 may include a switching arrangement that enables the outlet to be controlled by the PMU 530 (as shown) or by the media equipment device 502, 504, or 506. Switches 516, 518, and 520 are coupled to respective voltage supplies 562, 564, and 566 via power paths 562, 564, and 566, respectively. Voltage supplies 562, 564, and 566 are coupled to high voltage supply 560, and may include voltage dividers, current-limiting circuits and other protective devices to adjust the voltage from high voltage supply 560 to a level suitable for the particular media equipment device coupled to respective switch. In an embodiment, voltage supplies 562, 564, and 566 are coupled to high voltage supply 560 may be included in PMU 530.

In an embodiment, computer-controlled power source 514 may connect voltage to or disconnect voltage from a particular outlet in response to a command from PMU 530. PMU 530 may be any computerized unit capable of managing the power supply for one or more devices in a home. In particular, PMU 530 need not itself be the source of the voltage distributed by computer-controlled power source 514 to the various user equipment devices. In this embodiment, PMU 530 includes communication interface 532, processing circuitry 534, and storage 536. Storage 536 may include both volatile and non-volatile storage units, and may be fixed or removable. Storage 536 may store device classification metrics 546, which may include identification codes used by processing circuitry 534 to identify a device coupled to an outlet of computer-controlled power source 514. Storage 536 may also store power management schedules 548 for the devices. As described below in connection with FIG. 8, PMU 530 may be capable of identifying a particular device coupled to an outlet of power strip 514 based on a power signature associated with the device. Thus, when the device is plugged in somewhere else in the home, PMU 530 may determine how t operate the device by matching the power signature to the device to one of the power management schedules 548.

Processing circuitry 534 may be based on any suitable processing circuitry such as processing circuitry based on one or more microprocessors, microcontrollers, digital signal processors, programmable logic devices, etc. Processing circuitry 534 may include a number of modules for performing various functions related to power management of devices coupled to PMU 530. For example, processing circuitry 534 may include device detection and classification module 540, power control module 542, and time control circuitry 544. Device detection and classification module 540 may perform a device detection operation to determine the type of device coupled to a specified outlet before commanding computer-controlled power source 514 to supply power to the device or decouple power from the device. To perform detection, detection module 540 may cause computer-controlled power source 514 to provide a classification voltage within a specified range to the device, and may compare a response current or a voltage with a plurality of classification metrics to identify the device Detection module 540 may also compare the voltage or current received from the device with metrics 546 (or with similar metrics stored on a remote server using I/O path 538) to determine power requirements of the detected powered device. Device classification metrics 546 may include data, such as current signatures, obtained from manufacturers of the user equipment device. Processing circuitry 534 may also include power management module 542 for managing the power usage schedules 548 for devices 502, 504, and 506. In an embodiment, power management module 542 determines the usage schedule for the devices. In other embodiments, the devices themselves determine a usage schedule which is provided to PMU 530 so that module 542 may command computer-controlled power source 514 to connect or disconnect voltage at appropriate times. Timer control circuitry 544 may be similar to that described in connection with timer 318 (FIG. 3), with the exception that timer 544 need not be powered by a rechargeable battery at certain times. Timer control circuitry 544 may monitor the scheduled power-up or power-off times for user equipment devices 502, 504, and 506, and may notify power management module 542.

PMU 530 may include communications circuitry 532 suitable for communicating with computer-controlled power source 514, devices 502, 504, and 506, and other external devices and data sources as needed. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths.

Depending on the configuration of a particular device, supplying power to the device may put the device in standby mode, but not in a full-power mode to enable the device to perform scheduled actions such as program recordings. Therefore, in an embodiment, Infrared (IR) signal output 550 provided by an IR blaster (not shown) in PMU 530 may be used after a power-on notification is sent to the power strip 514 and the voltage is supplied to a particular one of devices 502, 504, and 506 in order to transition the device from a standby mode to a full-power mode. The IR signal 550 mimics the function of a remote controller when properly directed. For example, the IR blaster may be configured with multiple IR codes, each mapped to the power signature of one of user equipment device 502, 504, and 506. After connecting a voltage supply to a particular device, PMU 530 may instruct the IR blaster to "blast" an IR signal that corresponds to the IR code assigned to the particular device over a wide area of the home to cause the device to transition from a standby mode into a full-power mode.

Figure 6:
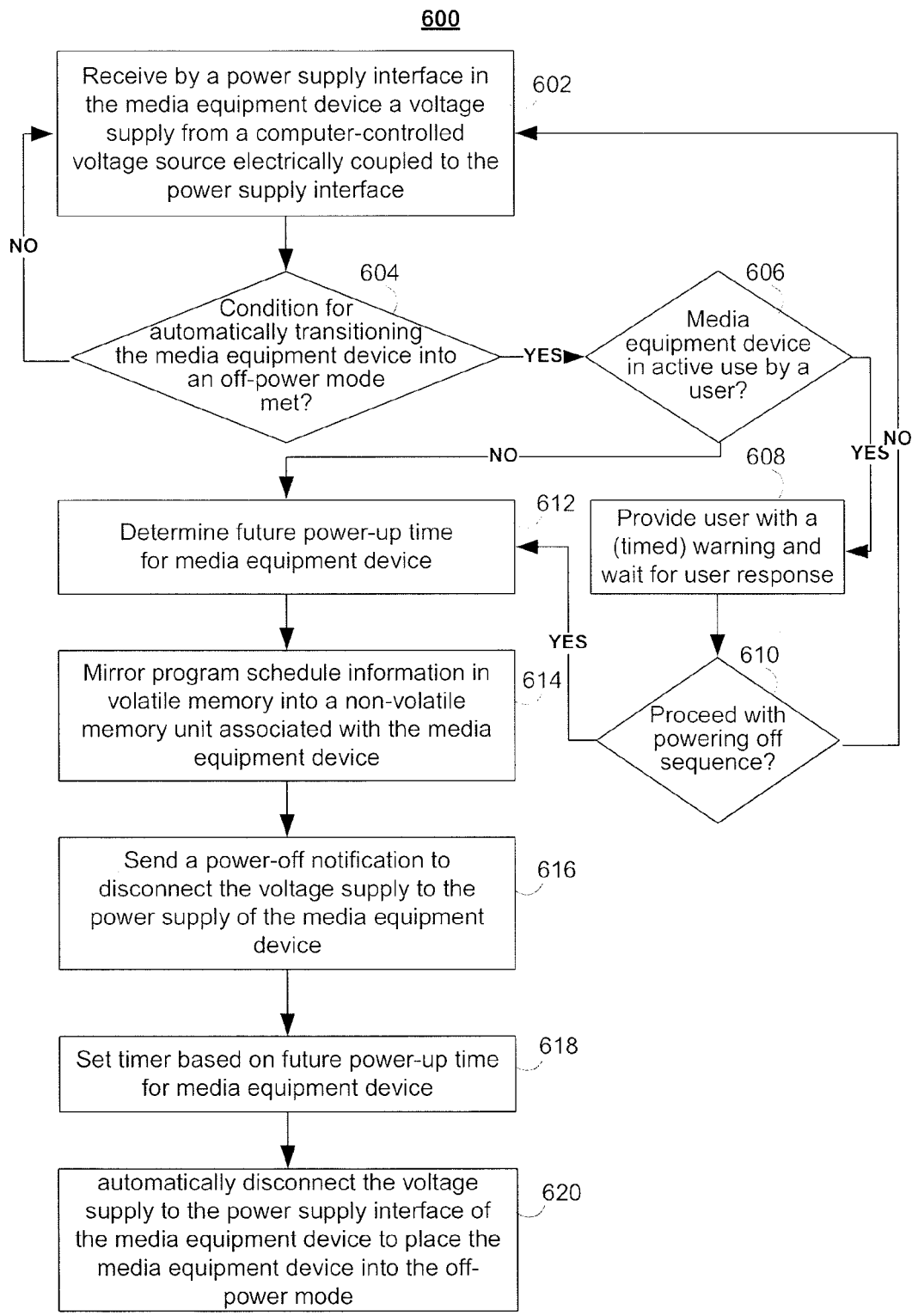
FIG. 6 is a flow chart of an illustrative process for automatically transitioning a media equipment device from a powered-up state to an off-power state.

FIG. 6 is a flow chart of illustrative process 600 for powering down a media equipment device having a full-power mode and an off-power mode. In an embodiment, the media equipment device also includes a standby mode of operation. At step 602, while the media equipment device is operating in full-power or standby mode, a power supply interface of the media equipment device, such as power supply interface 316 (FIG. 3), receives a voltage supply from a computer-controlled voltage source (e.g., computer-controlled voltage supply 514 (FIG. 5) electrically coupled to the power supply interface. The computer-controlled power supply may be controlled by an external power management unit (PMU) (e.g., PMU 530 of FIG. 5) or by the media equipment device itself. In an embodiment, the voltage supply is provided to the power supply interface of the media equipment device by a computer-controlled power source 514 that is capable to coupling voltage to or form individual outlets (516, 518, and 520) of the computer-controlled power source 514 (all of FIG. 5). At step 604, it is determined whether a threshold condition for transitioning the media equipment device into an off-power mode is met. In an embodiment, PMU 530 (FIG. 5) or the media equipment device (402, 404, or 406 of FIG. 4) may trigger the determination at predetermined intervals, or in response to another event, such as detecting that the user has transitioned the device from the full-power mode to the standby mode. In an embodiment, determining whether the threshold condition is met includes deriving a usage pattern for the media equipment device based at least in part on a usage history associated with the media equipment device, and predicting based on the usage pattern that the device will likely remain unused for at least a predetermined amount of time. In an embodiment, the threshold condition is met when a user transitions the device from the full-power mode to the standby mode after a certain time of the day (e.g., after 10:00 PM at night), or when no user- or provider-scheduled action for the media equipment device occurs for at least a predetermined duration.

If the threshold condition for transitioning the device into an off-power mode is not met, the process returns to step 602 and the media equipment device remains in the full-power or the standby mode. Otherwise, the process continues to step 606. At step 606, the media equipment device determines whether the media equipment device is in active use by a user (e.g., whether a user is watching television). If the media equipment device is in active use by a user, the process continues at step 608 where the user may be presented with a warning that the media equipment device is about to be powered off. In an embodiment, the user may be provided with an opportunity to postpone powering off the media equipment device. In an embodiment, the warning may be timed, such that if no user response is received within the specified time, the media equipment device concludes that the media equipment device is idle and may be powered off. At step 610, it is determined whether to proceed with the powering off sequence. Process 600 may proceed with the powering off sequence if the user declines to postpone the powering off sequence, or if the timer on the warning runs out without receiving a receiving a response from the user.

If the user elect to postpone the powering off sequence the process returns to step 602, where the media equipment device remains in a powered-up state. Otherwise, the process continues to step 612. At step 612, a scheduled power-up time is determined for the media equipment device. The scheduled power-up time may be based on start time of a scheduled recording, a scheduled reminder for a program, a user-programmed operating schedule for the media equipment device, or may be based on a schedule constructed based on a usage pattern deduced from various user profiles associated with the media equipment device. The scheduled power-up time may be determined by the media equipment device (e.g., devices 402, 404, and 406 of FIG. 4) or by the PMU (e.g., PMU 530 of FIG. 5). Specifically, the scheduled power-up time may be determined after taking into account the "boot-up" time that a media equipment device may require to fully power on. For example, if a recording is scheduled to be performed by a media equipment device at 8:30 PM and the device has a 5-minute boot up time, the scheduled power-up time may be set no later than 8:25 PM. However, as described below, the scheduled power-up time may be set earlier in order to allow time for the media equipment device to restore at least a portion of program schedule data before performing the recording. In alternate embodiments, the scheduled power-up time may be set to 8:30 PM and any necessary offset may be determined by the PMU or the media equipment device to ensure that the device powered-up and functional at the scheduled power-up time. At step 614, program schedule information stored in the volatile memory of the media equipment device may be mirrored into nonvolatile memory associated with the media equipment device prior to placing the device in a off-power mode. The nonvolatile memory may be specific to each device (e.g., non-volatile memory 324 of FIG. 3) or may be share between devices (e.g., central nonvolatile storage unit 428 of FIG. 4). It is understood that step 614 may be omitted if the media equipment device automatically stores program schedule information received at the media equipment device to a non-volatile storage unit instead of, or in addition to, storing the information in volatile memory. For example, in an embodiment, a portion of program schedule information needed in the near-term by user equipment devices 402, 404, and 406 (all of FIG. 4) may be cached in memory 308 (FIG. 3) for near-term use, while long-term schedule information is stored directly in nonvolatile memory such as local storage 324 (FIG. 3) or central nonvolatile storage 428 (FIG. 4), bypassing the volatile memory.

At step 616, a power-off notification is sent to the computer-controlled power source to disconnect the voltage supply from the power supply interface of the media equipment device. The power-off notification may be sent by the external PMU 530 (FIG. 5) or by the media equipment device itself. In an embodiment where the determination to transition the media equipment device into off-power mode originates with the PMU, the power-off notification from the media equipment to the PMU may indicate that the media equipment device has completed "house cleaning" tasks (such as mirroring program schedule information) and is ready to power-down. The power-off notification may include the scheduled power-up time determined at step 612 above. A timer may be set to monitor the scheduled power-up time at step 618 and the voltage supply to the power supply interface of the media equipment device may be disconnected at step 620. In an embodiment, the voltage supply to the media equipment device may be disconnected by disconnecting voltage to an outlet (516, 518, or 520 of FIG. 5) on a computer-controlled power source 514 (FIG. 5) in response to a power-off command from the PMU 530 (FIG. 5) or the media equipment device. In practice, one or more steps shown in process 600 may be combined with other steps, performed in any suitable order, performed in parallel (e.g., simultaneously or substantially simultaneously) or removed. While the discussion of process 600 focuses on media equipment devices, process 600 may be applied to any suitable appliance or device in the home. For example, rechargeable devices and appliances such as cellular telephones or toothbrushes may notify the PMU 530 to place the device in a standby or off-power mode after the batteries of the devices are fully charged by an outlet of power strip 514.

Figure 7A:
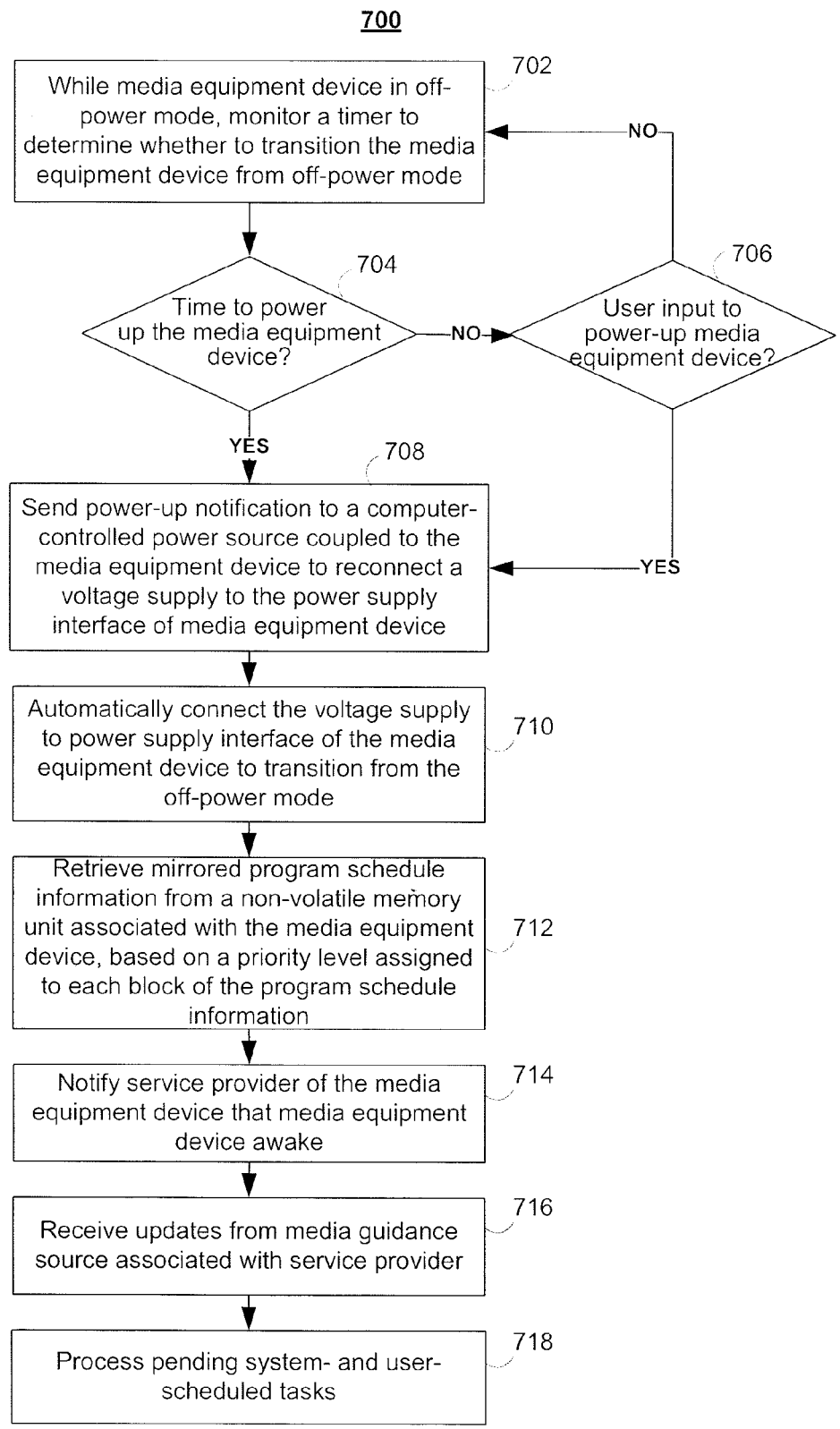
FIG. 7A is a flow chart for an illustrative process for automatically powering up a media equipment device that is in an off-power state.

FIG. 7A shows an illustrative process 700 for powering up a media equipment device that is in an off-power mode. At step 702, a timer may monitor the scheduled power-up time for the media equipment device. The scheduled power-up time may be monitored by internal timer 318 (FIG. 3) or by external timer 544 (FIG. 5) of the PMU 530 (FIG. 5), depending on whether the media equipment device or the PMU 530 (FIG. 5) controls the power source to the power supply interface of the media equipment device. In an embodiment, whether the scheduled power-up time is monitored by an internal or an external timer to the media equipment device depends on the duration that the media equipment device is expected to be in the off-power mode. Since the internal timer may be powered by a pre-charged battery, long sleep durations (e.g., when the media equipment device is placed in "vacation status" for a few weeks) may be monitored by a timer in the external PMU if the battery life of the internal timer may not last the entire duration that the media equipment device is expected to remain in the off-power mode. At step 704, a determination is made whether the scheduled power-up time for transitioning the media equipment device from the off-power mode is up. If the schedule power-up time is still running, the process continues to step 706 to determine whether a user input to transition the device from the off-power mode (i.e., to override the timer) has been received. If no user input is detected, the process returns to step 702 to monitor the timer.

Otherwise, if a user input to power-up the media equipment device is detected, or if the scheduled power-up time for transitioning the device from off-power mode is due, the process continues at step 708. At step 708, a power-up notification is sent to a computer-controlled voltage supply (e.g., computer-controlled power source 514 (FIG. 5)) to reconnect a voltage supply to the power supply interface of the media equipment device. The power-up notification may be sent by internal timer 318 (FIG. 3) or by PMU 530 (FIG. 5) based on the timer 544 (FIG. 5), depending on which timer was performing the monitoring at step 702 above. At step 710, the computer-controlled voltage source automatically connects voltage to the power supply interface of the media equipment device, and thereby causes the device to transition from the off-power mode into a powered state such as the full-power mode or the standby mode.

At step 712, the media equipment device retrieves program schedule information mirrored to a nonvolatile memory unit associated with the media equipment device. The nonvolatile memory unit may be included in the media equipment device (e.g., nonvolatile memory unit 324 of FIG. 3) or may be an external storage device (e.g., central storage unit 428 of FIG. 4). In an embodiment, program schedule information mirrored to nonvolatile storage may be retrieved in an order based on a priority level assigned to each subset or portion of the program schedule information, as described in more detail below in connection with FIG. 7B. In order to reduce frustrations due to unavailability of program schedule data when the media equipment device is first powered back up from off-power mode, the scheduled power-up time may be set sometime before the next scheduled action for the media equipment device in order to allow the device to restore data from mirror or obtain updates from the service provider before the scheduled action occurs. For example, if the media equipment device is scheduled to record a program at 8:30 PM, the device may transition from off-power mode at 8:15 PM so that the device may restore at least program schedule data for currently broadcast programs before the recording takes place.

The program schedule data obtained from the mirror in nonvolatile storage may be outdated and may need to be updated to reflect modifications made in the media guidance application source 418 (FIG. 4) while the media equipment device was powered off. At step 714, the media equipment device may notify a service provider that the device is awake (e.g., is in full-power mode or standby mode), and may request updates provided by the service provider while the media equipment device was in the off-power mode. In an embodiment, program schedule information may be provided in a carousel format. In such embodiments, the media equipment device may simply access data on the carousel without sending a notification or a request to the service provider. At step 716, the media equipment device may receive data and service updates from the media service provider. The service provider may transmit updates to perform system maintenance, software upgrades, or program schedule information updates. The received updates, including any pending user- and system-scheduled tasks may be performed by the media equipment device at step 718. In practice, one or more steps shown in process 700 may be combined with other steps, performed in any suitable order, performed in parallel (e.g., simultaneously or substantially simultaneously) or removed. While the discussion of process 700 focuses on media equipment devices, process 700 may be applied to any suitable appliance or device in the home.

Figure 7B:
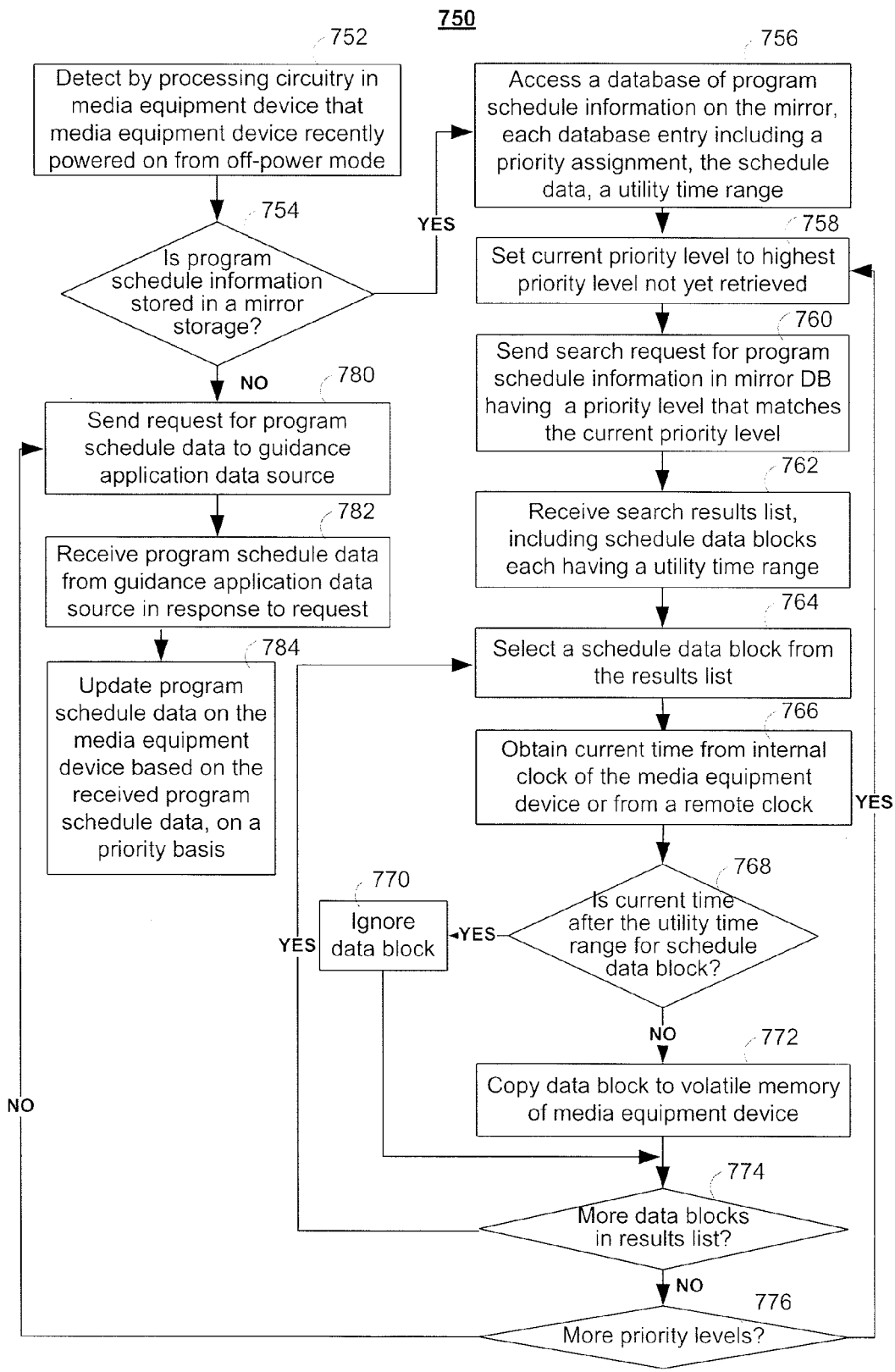
FIG. 7B is a flow chart of an illustrative process for retrieving guidance application data from nonvolatile storage after a media equipment device is powered up from the off-power mode.

FIG. 7B is a flow chart of an illustrative process 750 that may be used to retrieve guidance application data on a priority basis from nonvolatile storage mirror after a media equipment device is powered up from the off-power mode. At step 752, processing circuitry 304 (FIG. 3) in the media equipment device detects that the media equipment device has been powered up from the off-power mode. Step 752 may occur immediately after an infrared (IR) blaster triggers an IR signal output 550 (FIG. 5) having an IR code corresponding to that of the media equipment device. At step 754, it is determined whether program schedule data used by media guidance application is stored on a mirror. As described above, mirroring may not be performed if program schedule data obtained by the media guidance application is stored directly to nonvolatile memory, bypassing storage in volatile memory except for cached copies for immediate use. In addition, even when program schedule application is stored in volatile memory, an energy setting on the media equipment device may suppress mirroring in order to maximize energy savings. If program schedule information is not stored in a mirror, the process continues at step 780 which is described in below. Otherwise, the process continues at step 756.

At step 756, control circuitry 304 (FIG. 3) of the media equipment device access a database of program schedule information on the mirror storage. Each entry in the database may include a schedule data block, a priority level assigned to the schedule data block, and a "utility time range." A utility time range may be an indication of a time range during which the program to which the schedule data block refers is available to the media equipment device. For broadcast programs having a predetermined start-time and end time, the utility time range may be set to coincide to the start time and the end-time. For on-demand programs, the utility time range may be set to coincide with the duration for which the program is may be made available upon a request from the media equipment device. The utility time range may also be left blank, indicating that the schedule data block has utility at all times. The priority assignment for the schedule data block indicates a retrieving order for the schedule data block and may be set based on an expected utility of the schedule data block relative to other data blocks, based in part on the scheduled power-up time for the media equipment device. For example, program schedule information for programs scheduled to be broadcast shortly after scheduled power-up time may be assigned a higher priority than program schedule information distant programs. Similarly, program schedule information for programs designated as user favorites, programs having scheduled reminders, programs having scheduled recordings, programs on a channels designated as user favorites, may also be assigned higher priority. In addition, the priority levels may be refined to introduce a hierarchy within even the illustrative examples of generally higher priority schedule data listed above.

At step 758, the media equipment device sets the current priority level to be retrieved the highest priority level not yet retrieved from the mirror. At step 760, the control circuitry 304 (FIG. 3) of the media equipment device sends a search request to the mirror database for program schedule information that matches the current priority level and receives the search results at step 762. The search results may include schedule data blocks corresponding to the current priority level, and a utility time range for each respective schedule data block. At step 764, control circuitry 304 selects a block from the received schedule data blocks. At step 766, the control circuitry obtains the current time from an internal clock or a remote clock. In particular, it is understood that the media equipment device may take steps to synchronize its internal clock with that of a service provider prior to initializing process 750. At step 768, a determination is made whether the current time is after the utility time range for the data block. For example, if the current time is 8:30 PM, a schedule data block having a utility time range of 8:00 PM to 10:00 PM or 9:00 PM to 10:00 PM may still be useful, while one having a utility time range of 6:00 PM to 8:00 PM might not be. In determining utility at step 768 a schedule data block with an open-ended or an unspecified utility time range is deemed to satisfy the utility test.

If the current time is after the utility time range for the data block (i.e., the utility range is wholly in the past), the process continues to step 770 where the schedule data block is ignored. Otherwise, the process continues at step 772 where the data block is copied to a memory unit (e.g., storage 308 of FIG. 3) associated with the media equipment device. At step 774, control circuitry 304 checks whether more data blocks remain in the results list. If so, process 750 returns to step 764 to select the next schedule data block in the results list. Otherwise, the process continues at step 776 where it is determined whether more priority level remain to be retrieved. If so, the process returns to step 758 to set the current priority level to the next highest priority level not yet retrieved. Otherwise, the process continues at step 780.

At step 780, the media equipment device sends a request for program schedule information to a guidance application data source (e.g., media guidance application data source 418 of FIG. 4). The media equipment device may request program schedule information from the guidance application on a priority basis similar to that described above for retrieving program schedule data from the mirror storage. At step 782, the media equipment device receives program schedule information from the guidance application data source in response to the request. At step 784, the media equipment device may update the program schedule information on the media equipment device. In an embodiment, the media equipment device may update the program schedule information on a priority basis similar to that described above for retrieving program schedule data from the mirror storage.

In practice, one or more steps shown in process 750 may be combined with other steps, performed in any suitable order, performed in parallel (e.g., simultaneously or substantially simultaneously) or removed. For example, since a significant delay may occur between requesting program schedule information from a remote guidance application source (at step 780) and receiving the program schedule information, the media equipment device may initiate the request immediately after detecting that the media equipment device has been powered back up. In addition, the search request at step 760 may include criteria limiting the search to only schedule data blocks having a utility range in the present or the future, thereby eliminating the separate check at step 768. While the discussion of process 750 focuses on media equipment devices, process 750 may be applied to any suitable appliance or device in the home.

Figure 8:
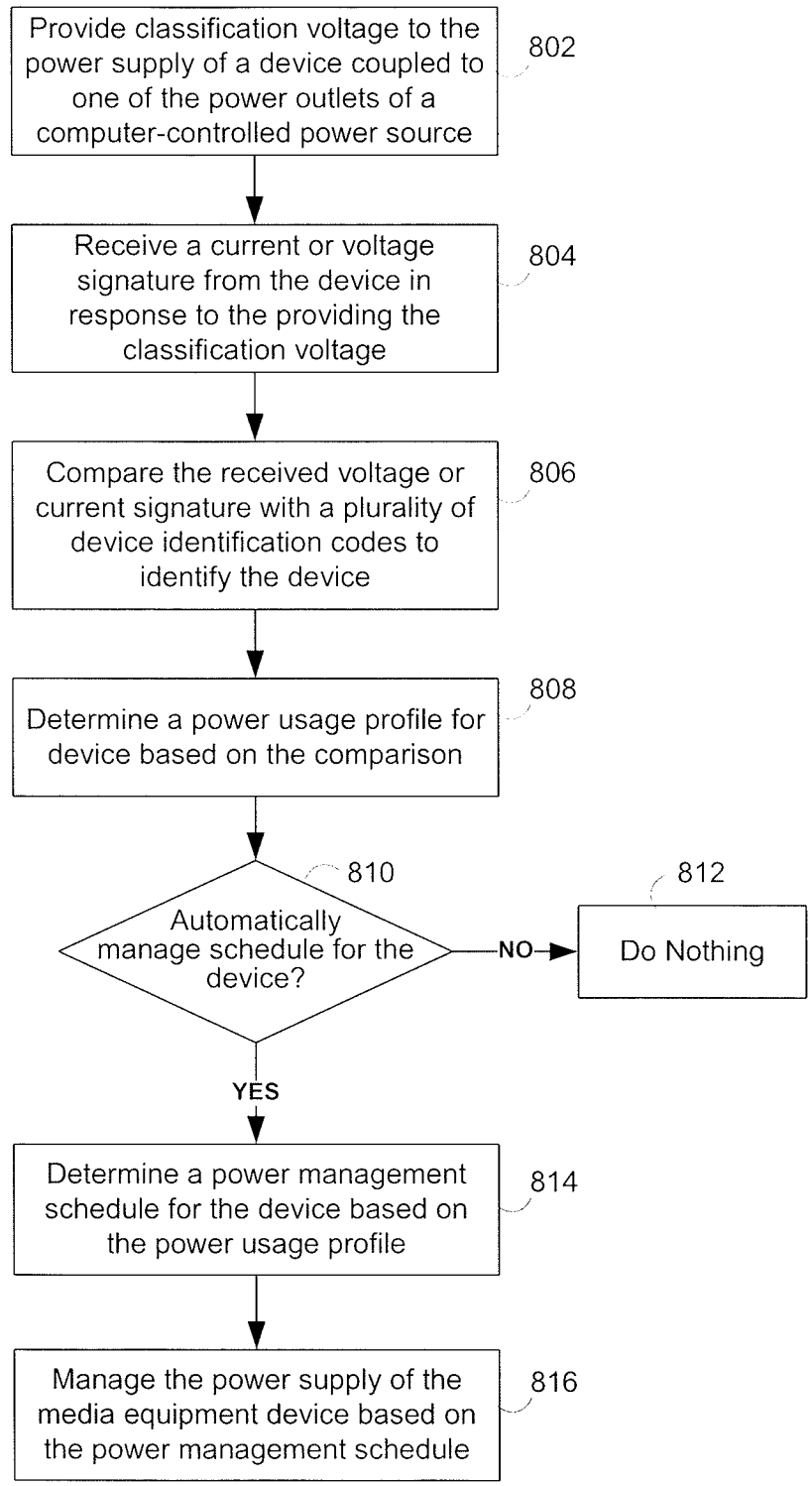
FIG. 8 is a flow chart for an illustrative process for determining a power management schedule for a consumer electronic device.

FIG. 8 shows illustrative process 800 that may be used to detect home devices (e.g., media equipment devices 402, 404, and 406 of FIG. 4) coupled to a computer-controlled power source and to optionally determine power management schemes for the same. While the discussion below focuses on media equipment devices, process 800 may be applied to any suitable appliance or device in the home. In an embodiment, the PMU 530 (FIG. 5) is configured to automatically detect and identify the particular device coupled to an outlet (516, 518, or 520 of FIG. 5) of the computer-controlled power source 514 (FIG. 5) before applying a voltage to the device. At step 802, the PMU 530 (FIG. 5) may cause the computer-controlled power source 514 (FIG. 5) to provide a classification voltage to the power supply of a media equipment device (e.g., user equipment devices 402, 404, and 406 of FIG. 4) coupled to one of the outlets of the computer-controlled power source. Step 802 may be initiated in response to detecting that a new device has been plugged into an outlet of the computer-controlled power source, or when the PMU is about to alter the voltage provided to the device (e.g., when altering the voltage supply to the device from 0 Volts to VCC). At step 804, the computer-controlled power source receives a voltage or a current signature from the device in response to providing the classification voltage provides information regarding the voltage or current signature (e.g., the magnitude) to the PMU. The computer-controlled power source may provide the information the PMU over a power line, an Ethernet cable, or other suitable communication link, such as a wireless link At step 806, the PMU compares the received voltage or current signature to a plurality of device identification codes that may be stored locally at the PMU or remotely on a remote central server. The classification codes may be provided by various device manufacturers, and each code may correspond to a unique current or voltage signature for a particular device. At step 808, the PMU may determine an appropriate power usage profile for the device. A power usage profile may assign the device to one of several device categories based on whether the device is generally considered a high-power consumer or a low-power consumer. The usage profile may also include a determination as to whether the device requires a continuous power supply, whether the device permits variations in power supply levels (e.g., between a full voltage and a reduced voltage), or whether the power level is to remain substantially constant for proper operation of the device. The power usage profile of the device may be created by power management module 544 (FIG. 5) based on classification metrics associated with the device and stored in storage unit 536 (FIG. 5). At step 810, a determination is made, based on power usage profile of the device, whether the PMU may automatically create a power management schedule for the device. If the PMU cannot automatically manage the power supply to the device, the process terminates at step 812. Otherwise, the process continues to step 814. At step 814, a power management schedule may be determined for the device based at least in part on the usage profile determined at step 808 above. The management schedule for the device may be based, for example, on third party (e.g., EPA) recommended power management schemes, recommendations by the device manufacturer, user-specific usage patterns, or other suitable criteria. The process continues at step 816 where the power supply for the device may be managed by the PMU based on the power management schedule for the device. In practice, one or more steps shown in process 800 may be combined with other steps, performed in any suitable order, performed in parallel (e.g., simultaneously or substantially simultaneously) or removed.

It will be appreciated that while the discussion of media content has focused on video content, the principles of media guidance can be applied to other types of media content, such as music, images, etc.

The above described embodiments of the present invention are presented for purposes of illustration and not of limitation, and the present invention is limited only by the claims which follow.

What is claimed is:

1. A method of operating a media equipment device having at least a full-power mode and an off-power mode of operation, the method comprising:

receiving by a power supply interface in the media equipment device a voltage supply from a computer-controlled voltage source electrically coupled to the power supply interface of the media equipment device;

receiving a user-programmable schedule of intended use of the media equipment device;

detecting that a first threshold condition for automatically transitioning the media equipment device into the off-power mode is met based on the user-programmable schedule indicating that the media equipment device will be unused for at least a threshold duration;

determining an amount of time for restoring at least a portion of program schedule information to the media equipment device when the voltage supply is reconnected to the media equipment device;

calculating a scheduled power-up time to be a time at which a next scheduled use of the media equipment device occurs, offset by the amount of time for restoring the portion of the program schedule information;

storing the scheduled power-up time for automatically restoring power to the media equipment device in the future;

sending a power-off notification to disconnect the voltage supply to the power supply interface of the media equipment device; and automatically disconnecting the voltage supply to the power supply interface of the media equipment device by the computer-controlled power source, thereby transitioning the media equipment device into the off-power mode such that the media equipment device receives substantially no external voltage.

2. The method of claim 1, wherein the media equipment device further includes a standby mode of operation in which the power supply interface receives a voltage supply level between that of the full-power mode and the off-power mode, the method further comprising: automatically transitioning the media equipment device from the full-power mode or the off-power mode to the standby mode when a second threshold condition is met.

3. The method of claim 1, further comprising scheduling a recording of a program on the media equipment device;

storing a start time of the recording; and sending the start time of the recording as the scheduled power-up time of the media equipment device in the power-off notification.

4. The method of claim 1, wherein the media equipment device is a set-top box.

5. The method of claim 1, wherein the media equipment device further includes a standby mode of operation, the method further comprising triggering said detecting only while the media equipment device is operating in the standby mode.

6. The method of claim 1, wherein said detecting is performed by the media equipment device.

7. The method of claim 1, wherein the computer-controlled power source is controlled by an external power management unit (PMU) communicatively coupled to the computer-controlled power source and the media equipment device, the method further comprising:

receiving by the PMU the power-off notification from the media equipment device;

storing by the PMU the scheduled power-up time for the media device; and transmitting by the PMU a second message to the computer controlled power source to disconnect voltage from the power supply interface of the media equipment device.

8. The method of claim 7, wherein said detecting is performed by the PMU.

9. The method of claim 1, further comprising:

monitoring by a timer circuitry the scheduled power-up time; and sending a power-on notification to the computer-controlled power source to reconnect the voltage supply to the media equipment device at the scheduled power-up time.

10. The method of claim 9, wherein said timer circuitry is located within the media equipment device.

11. The method of claim 9, wherein said timer circuitry is located within an external power management unit that controls the computer-controlled power source.

12. The method of claim 1, wherein the media equipment device includes externally-generated program schedule information received via a broadcast stream, the method further comprising:

in response to detecting that the first threshold condition is met, mirroring the externally-generated program schedule information from volatile memory into a nonvolatile memory unit associated with the media equipment device.

13. The method of claim 12, further comprising:

at the scheduled power-up time, retrieving the program schedule information from the nonvolatile memory based on a plurality of priority levels assigned to the program schedule information.

14. The method of claim 1, wherein detecting whether the first threshold condition is met comprises determining whether an energy-saving system parameter associated with the device is set.

15. The method of claim 1, wherein detecting whether the first threshold condition is met comprises:

deriving a usage pattern for the media equipment device based at least in part on a plurality of user profiles associated with the media equipment device; and predicting based on the usage pattern whether the device will remain unused for a predetermined amount of time.

16. The method of claim 1, wherein the media equipment device further includes a standby mode of operation, and wherein detecting whether the first threshold condition is met comprises determining whether the media equipment device is transitioned from the full-power mode the standby mode after a predetermined time of day.

17. The method of claim 1, wherein the media equipment device further includes a standby mode of operation, and wherein detecting whether the first threshold condition is met comprises determining whether the media equipment device is transitioned from the full-power mode the standby mode before a predetermined time of day.

18. The method of claim 1, wherein detecting whether the first threshold condition is met comprises determining whether a real-time action is scheduled to be performed by the device during a predefined duration.

19. The method of claim 18, wherein the real-time action is a program recording or a reminder for a program.

20. The method of claim 1, wherein detecting that the first threshold condition is met comprises predicting, based on a user profile information associated with the device, that the device will remain unused for at least a predefined duration.

21. The method of claim 1, wherein detecting that the first threshold condition is met comprises receiving an indication from a presence-detecting circuitry in response to the presence-detecting circuitry detecting that the device has been unused for at least a predetermined duration.

22. A system of operating a media equipment device having at least a full-power mode and an off-power mode of operation, the system comprising a computer processor configured to:

receive by a power supply interface in the media equipment device a voltage supply from a computer-controlled voltage source electrically coupled to the power supply interface of the media equipment device;

receive a user-programmable schedule of intended use of the media equipment device;

detect that a first threshold condition for automatically transitioning the media equipment device into the off-power mode is met based on the user-programmable schedule indicating that the media equipment device will be unused for at least a threshold duration;

determine an amount of time for restoring at least a portion of program schedule information to the media equipment device when the voltage supply is reconnected to the media equipment device;

calculate a scheduled power-up time to be a time at which a next scheduled use of the media equipment device occurs, offset by the amount of time for restoring the portion of the program schedule information;

store the scheduled power-up time for automatically restoring power to the media equipment device in the future;

send a power-off notification to disconnect the voltage supply to the power supply interface of the media equipment device; and automatically disconnect the voltage supply to the power supply interface of the media equipment device by the computer-controlled power source, thereby transitioning the media equipment device into the off-power mode such that the media equipment device receives substantially no external voltage.

23. The system of claim 22, wherein the media equipment device further includes a standby mode of operation in which the power supply interface receives a voltage supply level between that of the full-power mode and the off-power mode, and wherein the computer processor is further configured to:

automatically transition the media equipment device from the full-power mode or the off-power mode to the standby mode when a second threshold condition is met.

24. The system of claim 22, wherein the computer processor is further configured to:

schedule a recording of a program on the media equipment device;

store a start time of the recording; and send the start time of the recording as the scheduled power-up time of the media equipment device in the power-off notification.

25. The system of claim 22, wherein the media equipment device is a set-top box.

26. The system of claim 22, wherein the media equipment device further includes a standby mode of operation, and wherein the computer processor is configured to trigger said detecting only while the media equipment device is operating in the standby mode.

27. The system of claim 22, wherein said computer processor comprises a first processor located in the media equipment device, and wherein the first processor is configured to detect whether the first threshold condition is met.

28. The system of claim 22, further comprising an external power management unit (PMU) communicatively coupled to the computer-controlled power source and the media equipment device, wherein the PMU is configured to:

receive the power-off notification including the scheduled power-up time from the computer processor;

store the scheduled power-up time for the media equipment device on a storage unit associated with the PMU; and transmit a second message to the computer controlled power source to disconnect voltage from the power supply interface of the media equipment device.

29. The system of claim 28, wherein said computer processor comprises a first processor located in the PMU, and wherein the first processor is configured to detect whether the first threshold condition is met.

30. The system of claim 22, wherein the computer processor in further configured to:

monitor by a timer circuitry the scheduled power-up time; and send a power-on notification to the computer-controlled power source to reconnect the voltage supply to the media equipment device at the scheduled power-up time.

31. The system of claim 30, wherein said timer circuitry is located within the media equipment device.

32. The system of claim 30, wherein said timer circuitry is located within an external power management unit that controls the computer-controlled power source.

33. The system of claim 22, wherein the media equipment device includes externally-generated program schedule information received via a broadcast stream, and wherein the computer processor is configured to:

in response to detecting that the first threshold condition is met, cause the media equipment device to mirror the externally-generated program schedule information from volatile memory into a nonvolatile memory unit associated with the media equipment device.

34. The system of claim 33, wherein the computer processor is further configured to:

at the scheduled power-up time, cause the media equipment device to retrieve the program schedule information from the nonvolatile memory based on a plurality of priority levels assigned to the program schedule information.

35. The system of claim 22, wherein the computer processor is configured to detect whether the first threshold condition is met by determining whether an energy-saving system parameter associated with the device is set.

36. The system of claim 22, wherein the computer processor is configured to detect whether the first threshold condition is met by:

deriving a usage pattern for the media equipment device based at least in part on a plurality of user profiles associated with the media equipment device; and predicting based on the usage pattern whether the device will remain unused for a predetermined amount of time.

37. The system of claim 22, wherein the media equipment device further includes a standby mode of operation, and wherein the computer processor is configured to detect whether the first threshold condition is met by determining whether the media equipment device is transitioned from the full-power mode the standby mode after a predetermined time of day.

38. The system of claim 22, wherein the media equipment device further includes a standby mode of operation, and wherein the computer processor is configured to detect whether the first threshold condition is met by determining whether the media equipment device is transitioned from the full-power mode the standby mode before a predetermined time of day.

39. The system of claim 22, wherein the computer processor is configured to detect whether the first threshold condition is met by determining whether a real-time action is scheduled to be performed by the device during a predefined duration.

40. The system of claim 39, wherein the real-time action is a program recording or a reminder for a program.

41. The system of claim 22, wherein the computer processor is configured to detect that the first threshold condition is met by predicting, based on a user profile information associated with the device, that the device will remain unused for at least a predefined duration.

42. The system of claim 22, wherein the computer processor is configured to detect that the first threshold condition is met by receiving an indication from a presence-detecting circuitry in response to the presence-detecting circuitry detecting that the device has been unused for at least a predetermined duration.

43. The system of claim 22, wherein the computer processor comprises a first computer processor communicatively coupled to a second computer processor, and wherein (1) the first computer processor is configured to perform said detecting and said sending, and (2) the second computer processor is configured to perform said storing and to cause said disconnecting of the voltage supply.

44. The system of claim 43, wherein said first and second computer processors are located in the media equipment device.

\* \* \* \* \*